Figure 5:
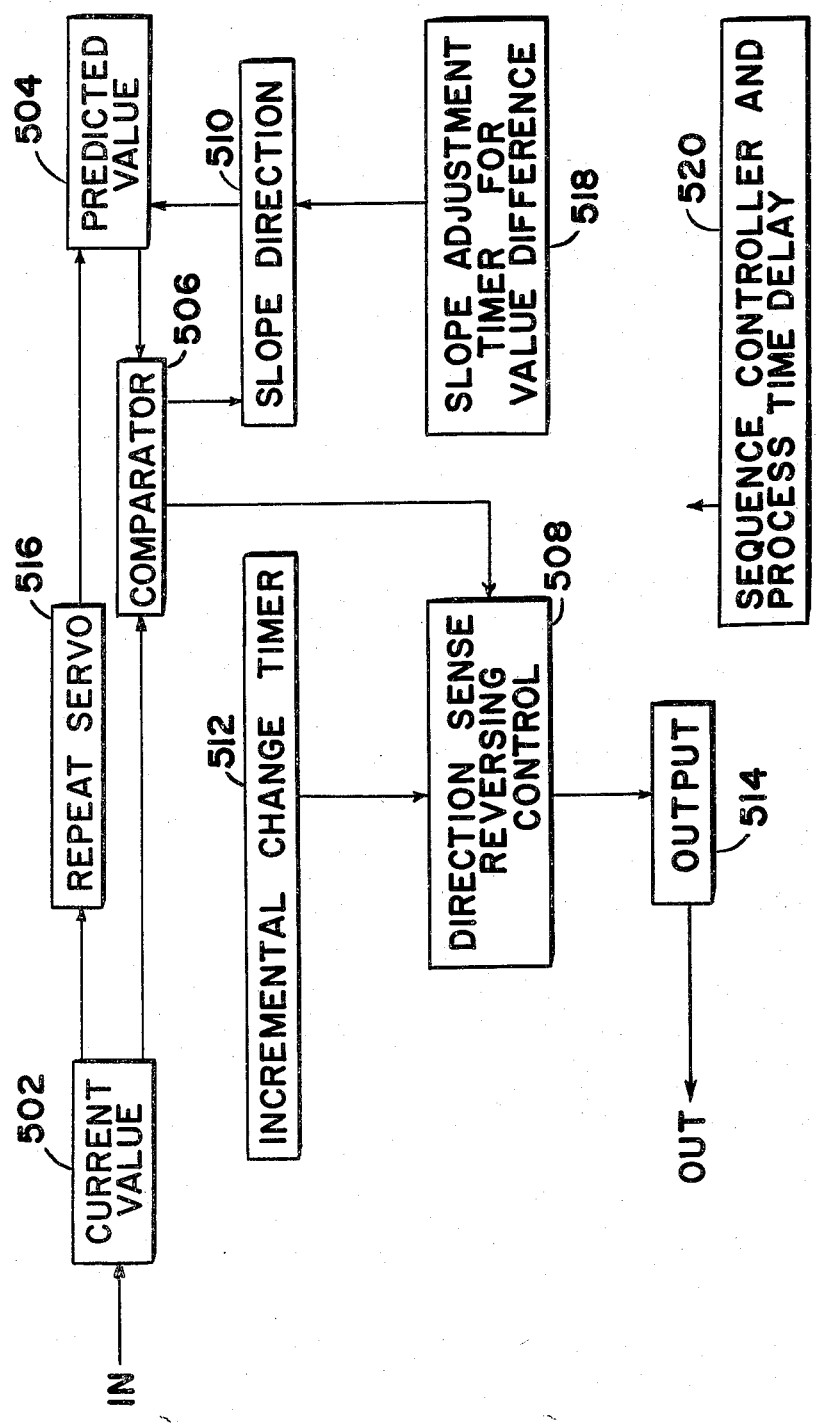

Feb. 21, 1961  R. B. WHITE  2,972,447
OPTIMAL CONTROLLER
Filed June 14, 1956  3 Sheets-Sheet 1
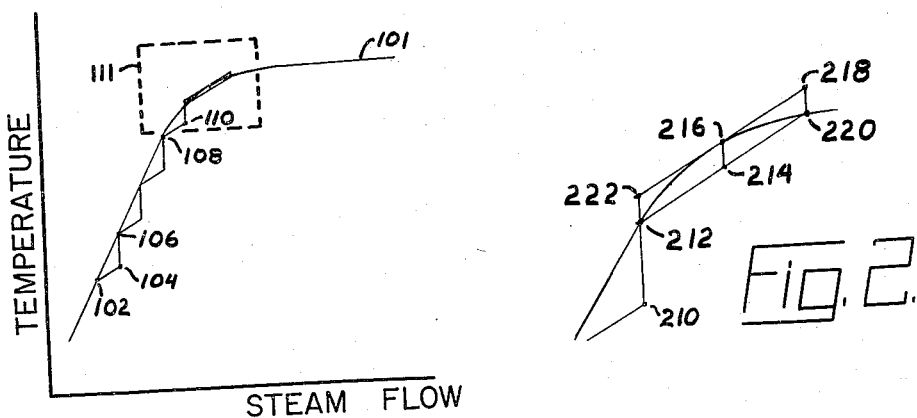
Fig. 1.
Fig. 2.
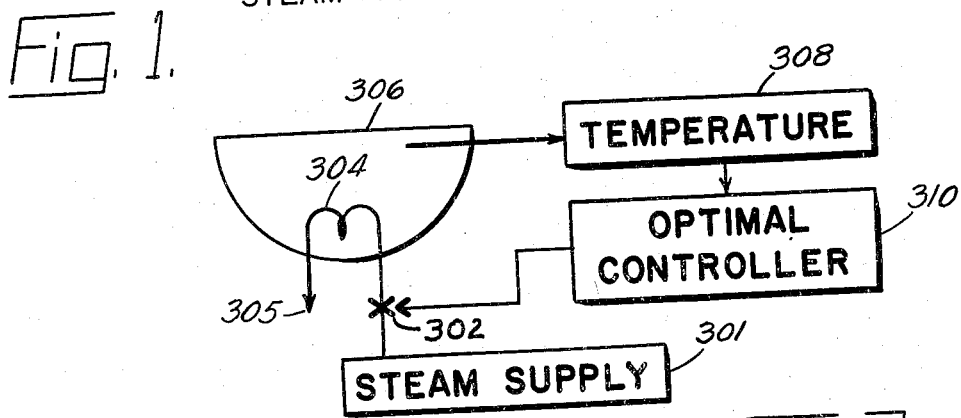
Fig. 3.
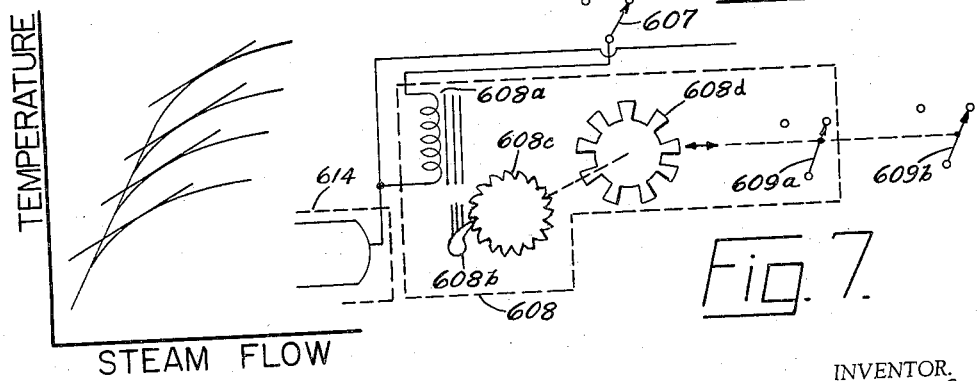
Fig. 4.
Fig. 7.
INVENTOR.
R. Byron White

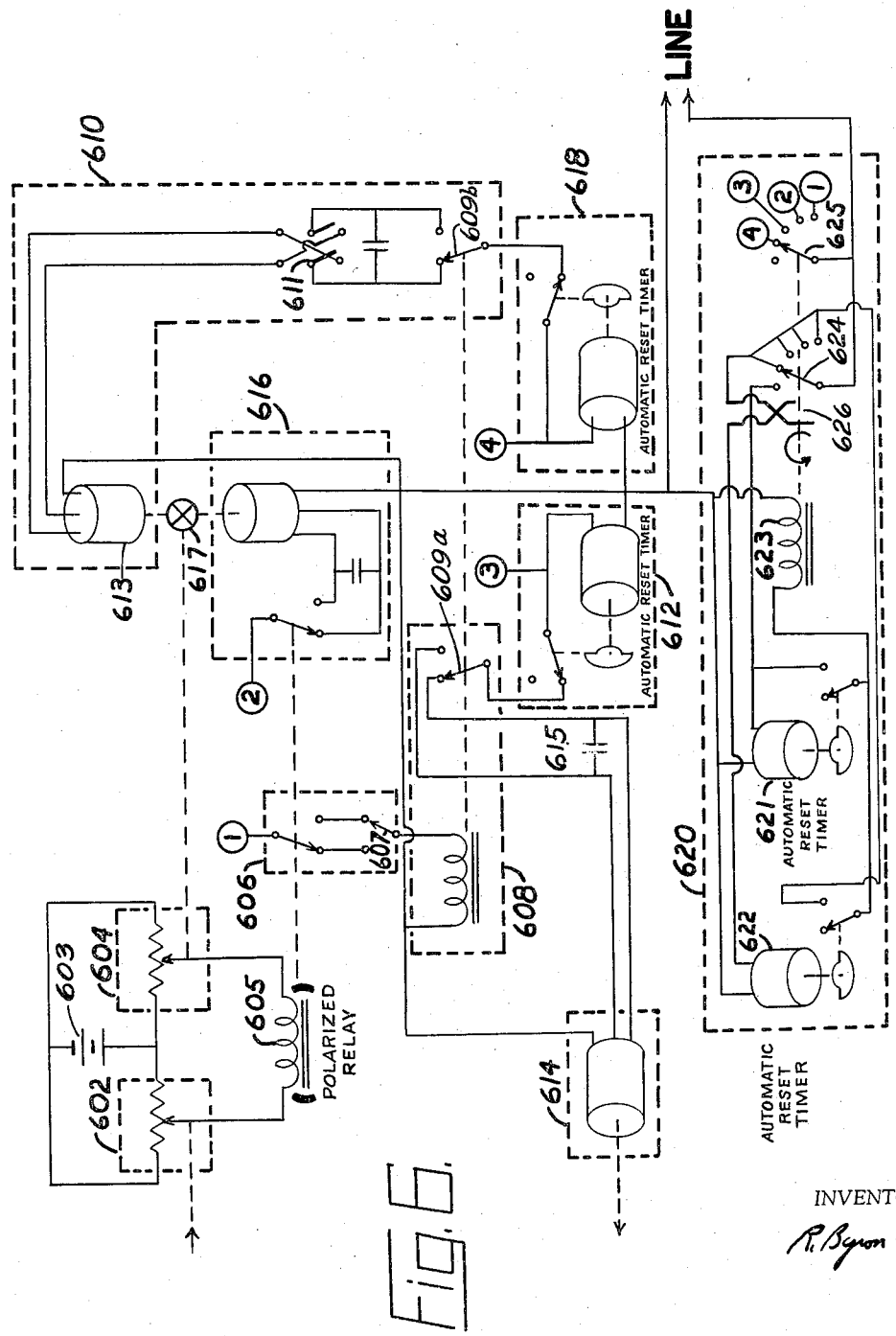

United States Patent Office 2,972,447
Patented Feb. 21, 1961

2,972,447

OPTIMAL CONTROLLER

Roby Byron White, 381 N. Main St., Sharon, Mass.

Filed June 14, 1956, Ser. No. 591,360

4 Claims. (Cl. 236—46)

The present invention relates to controllers and control methods and in particular to non-linear controllers capable of finding and maintaining optimal conditions in a complex system or process.

The current state of the art is summarized by the following quote from Patent Number 2,628,606, Control System by Draper and Li: " . . . the present invention contemplates control means for measuring an output quantity to be optimalized, and searching or hunting devices for effecting continuous variations in the input and for maintaining the input at or near such values that the maximum . . . output is attained."

The controller of this invention will perform, but is not limited to the essential control problem of the preceding paragraph. There are large groups of functions, square-law and logarithmic for example, which do not have a maximum or a minimum but which do have areas of rapidly changing slope and therefore may have need of for what will be termed herein, optimal control.

As used here, the words maximizing and minimizing infer control at the point of zero slope on the operational curve of a system or process; optimal control infers control at a point on an operational curve where the slope is other than zero. For both maximum control and optimal control, the control parameter is the slope of the process curve and not a fixed point on that curve. The point of operation defined is the point of tangency of a line drawn at the desired slope which coincides to the tangent line of the process curve.

To clarify the type of problem involved, the following examples are given:

Maximizing or zero slope control. A train travelling a straight, level track and with no wind will average some number of miles per gallon of fuel depending on the speed, and consequently, the throttle setting. It is apparent that the curve of miles per gallon versus throttle setting has a maximum since it goes to zero with a closed throttle, and, at the other end, falls rapidly because of air resistance at high speeds. The problem is to control the throttle such as to make the whole train operate at the maximum miles per gallon. The input quantity or variable of the system to be controlled is the throttle setting. The output quantity or variable of the system, which is to be maximized, is a ratio of two other variables, miles per hour and gallons per hour, both of which can be readily measured.

The same principles can be applied to ships or aircraft. Other examples of applications are obtaining maximum product in a continuous chemical process and minimizing fuel cost in a constant temperature furnace by controlling fuel-air ratio.

Optimal control on slopes other than zero. A process tank is to be heated from a steam line under conditions where the steam supply temperature is neither constant nor consistent. The curve of tank temperature versus steam usage rises rapidly as steam is added until the tank temperature begins to approach the steam temperature. At this point the rate-of-rise drops sharply and the curve approaches the steam temperature asymptotically. The last few degrees of rise are very expensive in terms of steam used. If it is economically justifiable to heat the tank at all then there is some balance or optimal point where the steam usage cost equals the value of heat in the process tank; this point can be represented by a slope on the curve. The controller which is the subject of this invention will maintain control on this slope of the characteristic curve of the process so as to obtain the optimal tank temperature, and thus the best cost balance, even though the steam temperature changes over a wide range.

Other examples where the control parameter is slope or rate-of-change of the system output quantity with respect to its input quantity are the efficiency of fractionating towers as a function of the cost of the heat input, and the absorption of oxygen in the blood stream as a function of concentration of oxygen in an oxygen tent.

Note that the rate-of-change referred to is with respect to the controlled variable, not with respect to time.

This invention is related both in concept and intent with the invention of my copending application for Optimal Controller, Serial Number 581,566, dated April 30, 1956. The advantage of the present invention lies in the simplicity of the mechanization.

An object of this invention is to provide a non-linear controller for systems or processes having the maximum, minimum and optimum characteristics as described above.

Another object of this invention is to provide a controller of the class described which will cause the controlled process to operate in the region of the desired slope or optimal point in a manner such as not to cause upset of delicate processes. This is accomplished by providing adjustments on the controller which are set to match the characteristics of the process such as response time between input and output and the steepness of slope of the process control curve.

Another object of this invention is to provide a non-linear type controller which will maintain optimal cost conditions in a system or process even though other unpredictable and uncontrollable conditions or factors, such as catalyst activities may be acting simultaneously.

Further objects and advantages of this invention, as well as its arrangement, construction and operation, will be apparent from the following description and claims in connection with the accompanying drawings, in which Fig. 1 is a graphical representation of the operation of this controller on a logarithmic process curve, Fig. 2 is an enlarged area of the curve of Fig. 1, Fig. 3 indicates a simple application of the optimal controller to the heating of a process tank, Fig. 4 shows typical operational curves for the application of Fig. 3, Fig. 5 is a block diagram of the preferred form of the optimal controller of this invention, Fig. 6 is a circuit diagram following the block diagram of Fig. 5, and Figure 7 is a detailed circuit diagram of a portion of the controller illustrated in Figure 6.

The invention will first be described in terms of its operation in controlling on a slope of a logarithmic process curve. Operational requirements and refinements will be defined as needed. Referring to Fig. 1, the operational curve of a typical process being controlled is indicated at 101. This curve could be the heating of the process tank described above and shown in block diagram form in Fig. 3. The ordinate of the curve 101 then becomes temperature, the input to the controller; and the abscissa of the curve 101 becomes steam flow, the controlled variable as indicated by the valve 302 of Fig. 3.

Controllers of this type are cause and effect operations. A change is made in the system input and the effect of that change in the system output determines what further control action is to be made. The controller of this invention automatically determines its control action by the direction of the difference between the value of the system output which has stabilized after an arbitrary change and a predicted value for the system output which is the sum of the value of the output before the change and the product of the amount of the arbitrary change times the desired rate of slope taking into account the signs of the values and the scale factors.

Consider Fig. 3. A steam supply 301 is supplying heat in order to increase the operating temperature of a process tank 306. This tank may, for example, be a cooking kettle for making chocolate. Heat, in the form of steam flow is supplied by the steam supply 301 through valve 302 to the heating coil 304 inside the tank. The steam, at a reduced temperature, exits as indicated at 305. The general shape of the process curve can be determined intuitively and is graphically represented by curve 101 of Fig. 1. Referring further to Fig. 3, it will be noted that an instrument for measuring temperature, as indicated at 308, continuously measures the temperature of the contents of the tank and provides this information as the input to the optimal controller 310. The output of the optimal controller is the adjustment of the throttling action of the steam valve 302.

From theoretical considerations it is known that the process curve has a "knee" or area of rapid change in slope. It is probable that some point on the "knee" of the curve is the most economical operating point since at lesser steam flow rates a large temperature rise is obtained for a unit change in steam flow, while at steam flows above the "knee" of the curve very little increase in temperature of the material in the process tank results from large changes in steam flow. For purposes of this example, let it be required that operation of the system is to be at a slope on the "knee" of the process curve.

The function of the optimal controller of this invention is such that it actually has control of the basic variable of the process, in this example, steam flow. It performs its function by making an arbitrary change in the steam flow to the process, predicting what the result of this change should be (such prediction being made on the basis of the desired slope), comparing the actual result of the change in steam flow with that predicted and basing further control action on the direction between the actual and predicted values. This sequence of events is repeated over and over.

In Fig. 1, assume that the actual curve representing the tank temperature as a function of steam flow for a given steam temperature is as indicated by curve 101. The controller of this invention is put into operation at temperature and flow conditions indicated by point 102. Arbitrarily, a change is made in steam flow which, to the scale of the curve, is equal to the difference in abscissas of points 102 and 104. The desired rate-of-change of the temperature with respect to steam flow is represented by the slope of the line from point 102 to point 104. The ordinate of point 104 is the value of tank temperature which the controller has predicted by adding an amount equal to the arbitrary change in steam flow multiplied by the desired slope to the tank temperature at point 102. After the tank temperature has stabilized as a result of the new steam flow, the actual temperature is indicated at point 106 since the point must lie on the curve 101. This is higher than the temperature predicted by the controller so the process is given another change in steam flow of the same amount and in the same direction as before. This is repeated several times until a new operating point 108 is reached and a predicted point 110 is obtained.

The area of this curve enclosed in the dashed-line square 111 is shown in enlarged view in Fig. 2. Point 210 of Fig. 2 is the same as point 110 of Fig. 1.

After the process has stabilized again the new operating point is point 212. Again the change is made in the steam flow in the same direction and of the same amount giving a predicted value at point 214 and an actual value at point 216. The same change is again made giving a new predicted value at point 218 but this time the actual value after the tank temperature has stabilized lies below point 218 at point 220.

A part of this invention is the requisite for operation under the last described conditions. The requirement for operation is as follows:

When controlling toward an apparent maximum the cyclical discrete changes in system input are consecutively made in the same direction until the current value for some cycle is less than the predicted value; when this condition occurs, the direction of the next discrete change in system input, and all changes thereafter until the condition occurs again, is reversed. For controlling toward an apparent minimum, the changes are made until the current value is greater than the predicted value at which time the input change direction is reversed. Thus, the direction of change of the input is determined by the sign or sense of the difference of the compared, actual and predicted values of the process output resulting from the preceding change in process output. The sense of the difference which will cause the direction of change of the input to reverse is determined by the characteristic of the process curve at the optimum operating region and is a predetermined factor.

The current value referred to is the value of the system output after it has stabilized from the last change and is being compared with the value predicted as a result of the last change in system input.

The term "apparent maximum" refers to a control area on a curve wherein the curve could be approaching a peak or maximum value. Thus the control area being sought on the curve 101 of Fig. 1 is referred to as controlling toward an apparent maximum. The controller has no way of determining that the maximum or peak is not actually there. Conversely, a control area near or at a minimum point on a curve is referred to as controlling toward an apparent minimum.

Referring to Fig. 2, the current value of the tank temperature is at point 220 and the predicted value as a result of the last change is point 218. According to the requisite established above, this requires a reversal of direction of the changes in the system input. Thus the steam flow is reduced the arbitrary amount and the new predicted value of system output returns to point 214. The current value is again point 216 but since the direction of steam flow change has been reversed the new predicted value is point 222. After stabilization the current value is at point 212. Here again the current value is less than the predicted value so the direction of the changes in steam flow is reversed and once again the predicted value is point 214. As long as the process is operating on this characteristic curve the controller will force it to oscillate back and forth between points 212 and 220. This area has the desired average slope and if the incremental changes in steam flow are made small the deviation over the hunting area will be negligible.

Fig. 4 indicates the effect of changing steam supply temperature. Instead of a single characteristic curve for the process there is a whole family, four of which are illustrated. The function of the controller described here is to maintain control on the indicated slope no matter how the steam temperature changes. Thus the economic balance between cost of steam and value of heat in the tank is maintained and cost of heating is minimized.

From the operation as described, the requirements of the controller can be determined. It must meet the reversing requirement as given above. It must provide an output, which is the system input, which is adjustable in magnitude to compensate for desired accuracy of control and steepness of the control curve. It must allow time for the system to stabilize after a change is made before taking further control action. It must have a means of setting various control slopes both in terms of rate-of-change and whether positive or negative. A block diagram meeting all of these requirements is shown in Fig. 5.

There are five steps taken by this controller for each of the cycles described above. Referring to Fig. 5, these steps are as follows:

(1) Compare the current value 502 with the predicted value 504 by means of the comparator 506 and if reversing the output is called for, reverse the slope direction 510 and the direction sense reversing control 508.

(2) In order to provide a starting place for a new predicted value, drive the predicted value storage 504 to equal the current value by means of the repeat servo 516.

(3) Provide an incremental change in output [system input]; to make the amount of the change in system input adjustable, the incremental change timer 512 is provided and the timed signal is controlled in direction by the direction sense reversing control 508 before reaching the output 514.

(4) In the construction of this block diagram, the difference between the current and predicted values becomes a timed output of the slope adjustment timer for value difference 518 and the desired slope is determined by the ratio of times set on timers 518 and 512; the output from timer 518 is determined in direction sense by slope direction control 510 and added to the current value at the predicted value storage 504.

(5) The entire sequence of steps is controlled by the sequence controller and process time delay 520 which after time has elapsed for the controlled system to stabilize, recycles back to step 1 and goes through the steps as outlined, again and again.

Fig. 6 shows a possible circuit diagram for mechanizing the block diagram of Fig. 5. In Fig. 6 the current value is carried as an analog shaft rotation and thus a voltage at block 602. The predicted value storage is done in the same manner at block 604. The polarized relay 605 connected between these two voltages acts both as a comparator with contacts in block 606 and a relay servo in block 616. The switch 607 selects between apparent maximum and apparent minimum type curves. The output of the comparator, block 606, operates a latching type relay in the direction sense reversing control block 608 and with auxiliary contacts in the slope direction block 610. The type OCS relay made by the Automatic Electric Company of Chicago, Illinois, is typical of the latching type relay referred to above. The latching relay of block 608 is shown diagrammatically in Figure 6. The coil 608a pulls the pawl 608b against the ratchet 608c causing a single step of the notched wheel 608d. The stepping of the notch wheel causes the contact blades 609a and 609b to move from one contact point to the other. The incremental change timer block 612 operates the incremental output 614 through the reversing contacts of block 608 as listed above. The timers of blocks 612 and 618 and the timers 621 and 622 are all identical in operation. Basically they are of the automatic reset type wherein a timing action starts at the moment power is applied; after an adjustable time delay a single pole double throw switch is actuated and timing action stops; and as soon as power is even momentarily removed the timer automatically resets, the switch is returned to its original position and the timer is ready for another cycle. Timers of this general type are manufactured by The Vocaline Company of America, Old Saybrook, Conn., or by the Automatic Temperature Control Corporation, Philadelphia, Pa. The slope adjustment timer block 618 drives through the reversing contacts from the reversing control of block 608, through reversing switch 611 to motor 613 which drives through mechanical differential 617 to add the predicted value difference to the current value at block 604. Switch 611 is a manual switch whose setting is determined by the mathematical positive or negative sign of the slope on which control is desired. The sequence controller and process time delay block 620 contains two motor driven time delay relays 621 and 622 and the sequence controlling rotary stepping switch 623. Time delay relay 621 is set for the stabilization time of the process. Time delay relay 622 controls the sequencing of the controller and its time delay is set for a slightly greater time than that required by any of the first four aforementioned steps of the controller sequence. The numbers in circles of contact bank 625 connect to the same circled numbers in the remainder of the diagram and indicate the sequence in the same order as the aforementioned steps. The electrical connections are so indicated for clarity in that the additional lines for making these connections would only serve to confuse the diagram.

The operation of the circuit of Figure 6 will now be described in terms of the sequence of operations and the five steps as listed above.

*Step 1.*—The input to the controller is applied as an analog shaft position on the potentiometer of box 602. The shaft position of the potentiometer of box 604 indicates the previously predicted value for the current cycle. Both potentiometers are excited by a common battery 603. Thus, the polarized relay 605 will indicate the direction or polarity of the comparative values of actual and predicted input to the controller. In box 606, the switch 607 is manually set for an apparent maximum or an apparent minimum type curve; the position of switch 607 and its wiring to the other contacts contained in box 606 are such that when power is applied to the connections of Step 1 by the contacts 625 of relay 623 in box 620, a voltage is applied to cause the latching relay of box 608 to reverse the position of the contacts 609a for direction sense reversing control and 609b for reversing the slope direction.

*Step 2.*—Power is applied at the line indicated by circled 2 to make the predicted value storage equal the current value. The direction of drive is controlled by the contacts of polarized relay 605 contained in box 616; the reversibly controlled motor of box 616 drives through differential 617 to the arm of the potentiometer of box 604. When the balance point is reached the relay 605 will continuously reverse until the sequence controller steps to Step 3.

*Step 3.*—Power is applied through the switch contacts of the incremental change timer 612, through the direction sense reversing control contacts 609a to the reversible output motor of box 614. The capacitor 615 provides the necessary phase shift to the motor of box 614 for reversing action. Thus, a discrete step is provided in the output once each cycle.

*Step 4.*—To obtain the predicted value of the process output it is necessary to add a small discrete change to the arm position of the potentiometer in box 604. This change must be of such a polarity as would be expected from the Step 3 change in process input and of an amount having an adjustable proportion of the output of Step 3 taking into account the scale factors. Since the output was on a timed basis, this is also done by a timed basis. Thus, power is applied through the contacts of the timer of box 618, through the slope direction contacts 609b which fulfill the polarity requirement, through switch 611 which is manually set to a positive or negative slope according to the type of curve and where on that curve control is to be accomplished, and to reversible motor 613. The arm of potentiometer 604 is mechanically driven through the differential 617.

*Step 5.*—This is a waiting step for the process to stabilize after the process input change of Step 3. The time of waiting is manually set at timer 621. The timer 622 provides the timed periods for the stepping of rotary relay 623 during the Steps 1, 2, 3 and 4. Each time the contacts of timer 622 are closed, the coil of relay 623 is energized and causes the contact arms 624 and 625 to rotate one step. Simultaneously, the normally closed switch 626 is opened and breaks the power supply to the timer 622. The opening of switch 626 causes the timer 622 to reset automatically. When the timer 622 has reset, its contacts open, deenergizing the coil of relay 623, and allows switch 626 to close and start another cycle. When the contact arms 624 and 625 come to the last step, current passes through arm 624 and drives the timer 621. The timer 621 delays further operation of the controller until the process has stabilized. When the timer 621 closes its contacts after the stabilization time, the rotary relay 623 is energized and returns to Step 1.

Referring again to Fig. 3, the input to the optimal controller of this invention in the example cited is an analog of the temperature of the material in the process tank 306. This is provided by temperature indicator 308 and is presented to block 602 of Fig. 6 as an analog shaft position which controls the moving arm of a potentiometer and thus the voltage picked off to feed to relay 605. The output of the controller in the example of Fig. 3 controls the position of a throttling valve and thus the steam flow. The output motor of block 614 of Fig. 6 could control a small valve directly or, in the case of a large valve, may control the setting of an air regulator which would control the positioning of a large valve through the medium of compressed air.

It is understood that the generic term process may be used to cover all types of mechanical, electrical, or chemical systems or processes to which a controller of the type herein described may find application.

It is noted that maximum and minimum control are only special cases of the general problem of slope control, the case of zero slope. Since the controller of this invention is sensitive to whether it is near a maximum or a minimum, it follows that for zero slope settings, it will hold a maximum or a minimum.

Having thus described the invention, listed its advantages and illustrated its applications, I claim:

1. Apparatus for automatically controlling a steam supplied heating process having a point of optimum operation comprising means for storing a value equivalent to the absolute value of the slope and the sign of the slope of the point of optimum operation on a process curve which gives the instantaneous relation between steam flow and output temperature; means for converting the temperature output quantity of the process to an analog equivalent; drive means including an incremental change timer and a direction sense reversing control for increasing and decreasing in uniform preselected discrete amounts the input steam flow to the process; means for storing a predicted temperature output for the change in input steam flow, such predicted temperature being stored as an analog quantity equivalent in scale to the analog of the temperature output; a comparator for comparing the temperature output analog and the stored predicted temperature analog and reversing the direction sense reversing control of the drive means when the point of optimum operation is in the region of an apparent maximum on the process curve and the output temperature analog is less than the stored predicted temperature analog, and also reversing the direction sense reversing control when the point of optimum operation is in the region of an apparent minimum on the process curve and the temperature output analog is more than the stored predicted temperature analog; means for changing the stored predicted temperature analog to equal the temperature output analog after the operation of the comparator; means for actuating the drive means causing the drive means to change the input steam flow the preselected discrete amount; means for adding to the changed predicted temperature analog a differential analog proportional to the product of the stored slope value and the preselected discrete change in input; means for delaying the next operation of the comparator until the output temperature has stabilized following the last operation of the drive means; and a programmer including the means for actuating the drive means for controlling the time sequence of the parts comprising the apparatus in constantly repeating order.

2. Apparatus for automatically controlling a process having an optimum operating region and in which the process output quantity is dependent on the input quantity to the process comprising means including a timer and a direction sense reversing control for increasing and decreasing in preselected discrete amounts the input quantity to the process; means for converting the output quantity of the process to an analog equivalent; means for predicting what the value of the output quantity would be as a result of a change in the input quantity if the process were operating in the optimum operating region, said last named means storing an analog equivalent to the value of the predicted output quantity; means for comparing the two analogs and reversing the direction sense reversing control of the drive means if the optimum operating region is in the region of an apparent maximum on a curve which gives the instantaneous relation between the input and output quantities and the output quantity analog is less than the analog of the predicted output quantity, said last named means also reversing the direction sense reversing control of the drive means when the optimum operating region is in the region of an apparent minimum on the curve and the output quantity analog is greater than the analog of the predicted output quantity; and a programmer connected to each of the means and causing the apparatus to recycle continuously.

3. In apparatus for controlling a process having an optimum operating region and in which the process output quantity is dependent on an input quantity to the process comprising drive means for increasing and decreasing the input quantity to the process in preselected discrete amounts; means for producing a signal which is a measure of the process output quantity after the input quantity has been changed; means predicting and storing a signal representing what the value of the output quantity would be as a result of the change in input quantity if the process were operating at the optimum operating region; means for comparing the two signals; and additional means including the drive means for changing the input quantity again the discrete amount in the same direction as the preceding change, said additional means reversing the direction of change when the optimum operating region is in the region of an apparent maximum on a curve which gives the instantaneous relation between input and output quantities and the comparator indicates the output quantity signal is less than the stored signal of the predicted output quantity and also reversing the direction of change when the optimum operating region is in the region of an apparent minimum on a curve and the comparator indicates that the output quantity signal is greater than the stored signal of the predicted output quantity; and a programmer for controlling the sequence of operation of all of the means in constantly repeating order.

4. Apparatus as defined in claim 3 further characterized by means including a timer preventing the drive means from changing the input quantity to the process before the expiration of a predetermined period.

References Cited in the file of this patent

UNITED STATES PATENTS

| | | |
|---|---|---|
| 2,666,584 | Kliever | Jan. 19, 1954 |
| 2,687,612 | Anderson et al. | Aug. 31, 1954 |
| 2,761,284 | Malick | Sept. 4, 1956 |